Nov. 27, 1962 E. MÜLLER 3,065,781
METHOD AND MEANS FOR ELONGATING WORKPIECES
Filed Nov. 19, 1958 2 Sheets-Sheet 1
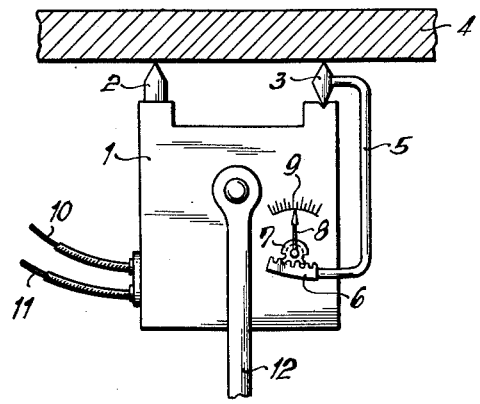
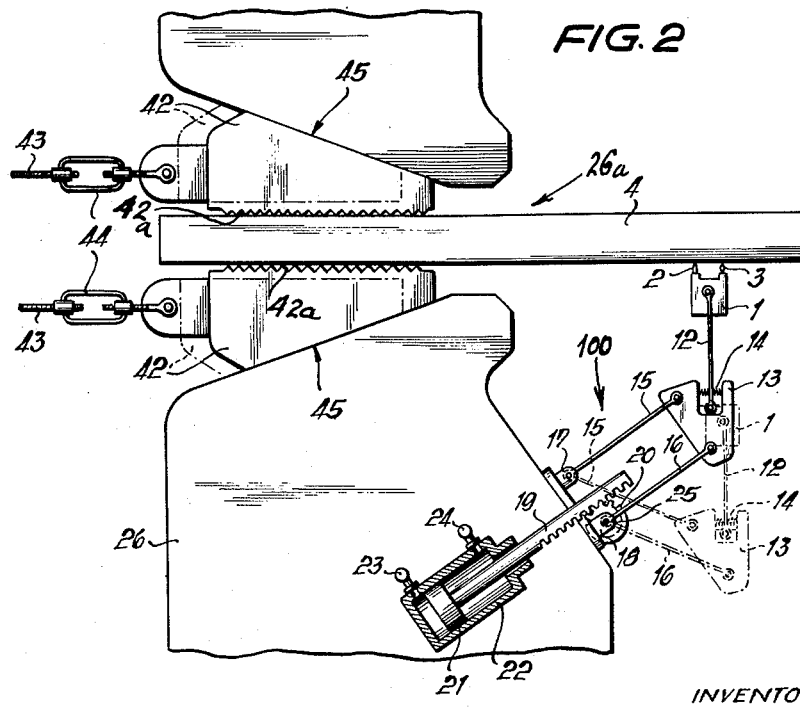
INVENTOR
ERNST MÜLLER
BY Nov. 27, 1962      E. MÜLLER      3,065,781

METHOD AND MEANS FOR ELONGATING WORKPIECES

Filed Nov. 19, 1958      2 Sheets-Sheet 2

INVENTOR
ERNST MÜLLER 3,065,781
METHOD AND MEANS FOR ELONGATING
WORKPIECES
Ernst Müller, Duisburg, Germany, assignor to
Hydraulik G.m.b.H., Duisburg, Germany
Filed Nov. 19, 1958, Ser. No. 774,907
Claims priority, application Germany Nov. 28, 1957
9 Claims. (Cl. 153—35)

The present invention relates to method and means for stretching or elongating, in particular planar members.

The present invention is concerned with the problem of the rupture of workpieces, such as metal sheets and plates, when stretched in a stretching machine.

In such a machine, the workpiece is subjected to tensile stress in order to elongate the workpiece beyond it elastic limit. If the workpiece is ruptured, then large tensile forces are immediately released within the stressed parts of the stretching machine and it is necessary to provide means to absorb these forces. In addition, the rupture of a relatively heavy workpiece always represents a danger both for the machine and its operator.

Therefore, it is an object of the present invention to provide means ensuring the elimination of or a reduction in the dangerous propensities of the prior art stretching machines.

A thorough investigation of the causes of the rupture, unless due to defects in the material, such as shrink holes, has shown that the rupturing of the workpiece is caused by the prior art methods of operating and constructing chucks used in the machines. A chuck assembly for a prior art sheet metal stretching machine has a plurality of chuck elements distributed over several juxtaposed clamping elements, so that each clamping element can adapt itself independently of the others, to an irregularity in the thickness of the workpiece.

Assuming that the reaction forces of the clamping elements are absorbed directly by the frame body of the chucks, it is unavoidable, with large friction forces and a method of operation wherein the stretching process is effected in one operation, that the clamping effect of the indirect clamping elements diminishes. This is due to the fact that the frame body of the chuck is bent up by the friction forces with the result that the supporting surfaces of the clamping elements yield. Consequently, it follows that the marginal or outer edge areas of a plate that is being stretched will be extended to a greater degree than the central areas. This also explains the reason for the plates usually breaking in the region of the chuck, because the irregular stress and strain distribution is most pronounced in said region. Even if a plate is not ruptured when stretched to the desired extent, the prior art method and apparatus results in a greater degree of stretching along the longitudinal edges than in the center of the plate.

Therefore, it is another object of the present invention to provide means affording the prevention of the irregular or uneven stretching of the workpiece.

Another object of the present invention is to provide means facilitating the stretching of workpieces by eliminating the rupture thereof especially in the region of the chuck.

Another object of the present invention is the provision of means contriving an apparatus for stretching planar workpieces which utilizes a chuck of the described type and which assures the prevention of an irregularly distributed extension over the width of or across the workpiece.

A further object of the present invention is the provision of means achieving a highly novel and efficient chuck assembly wherein the clamping elements can be controlled independently of each other so as to assure that the initiation of the full clamping effect of the clamping elements can be varied individually or to provide that the clamping effect diminishes in the individual elements.

These and other objects of the invention will become further apparent from the following detailed description, reference being made to the accompanying drawings showing a preferred embodiment of the invention.

In the drawings which illustrate the best mode presently contemplated of carrying out the invention:

FIG. 1 is a view, in elevation, of an extensometer in operative position;

FIG. 2 is a view, in elevation, of a device for supporting an extensometer and raising it to a planar workpiece which is to be stretched with a chuck device;

Figure 3:
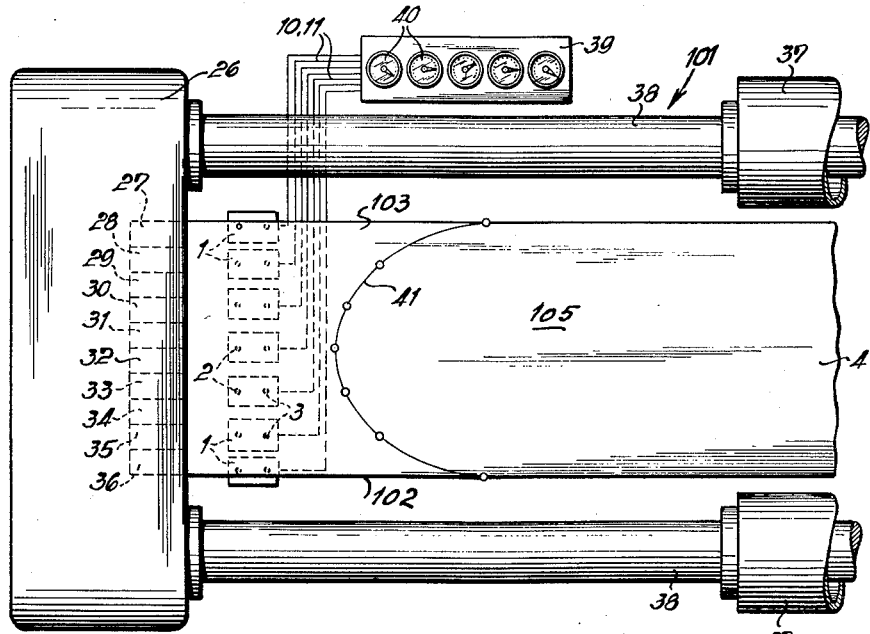
FIG. 3 is a view, in elevation, of a measuring apparatus provided on a stretching machine.

The present invention is directed to means utilizing a chuck of the previously described type to prevent an irregular elongation or stretching of a workpiece across the widthwise dimension thereof. The solution to the problem, pursuant to the present invention, resides in a method employing two phases in effecting the stretching of planar workpieces.

In the first phase, the extensions in the workpiece are measured at several points along one transverse plane of the workpiece and are compared with each other. In the second phase, a correction or adjustment is effected in the juxtaposed clamping elements in accordance with the various extensions. Those clamping elements, which are associated with the points of greater elongation, that is, which are closest to such points, are loosened or made less effective in the following stretching phase than the clamping elements associated with the points of lesser extension. Consequently, with a relatively low stretching force, there is obtained pronounced varying extension values, measuring the extension in a transverse plane of the workpiece directly ahead of the chuck device. Conventional means, such as extension measuring strips, or other instruments which permit a remote reading of the extension values, can be used to measure the extensions or elongations.

The manner in which the correction of the adjustment is effected at the clamping elements, the necessity for and the changes required in the chuck device, depends on the construction utilized or on the allowable expenditure of apparatus.

If loose wedge jaws are available, if the type which, when brought to the workpiece, penetrate the workpiece during the stretching operation, with toothed clamping faces and produce the clamping force, due to the wedge effect, only when they are carried along, the above-mentioned correction is very simple. Said correction can be effected, without any change in the chuck device, by pushing the clamping jaws back by hand, after an intermittent loosening of the clamping elements, in the vicinity of the plate edges where the elongations are greatest.

Consequently, when the sliding wedges of all the clamping elements are again brought to the workpiece, these clamping jaws will become effective at a point later than that for which they were previously set. Consequently, when the frame body bends up due to the reaction forces of the presently gripping central clamping elements, and these clamping jaws slide down and grip again, only then do the jaws of the outer corrected clamping elements begin to grip. From then on, nothing much can change in the clamping conditions in the course of the second stretching phase. If necessary, the correcting process can be repeated several times.

In order to be able to carry out the chuck corrections without any great loss of time, and to the exactly determined extent, the prior art chuck device must be modified. In such prior art devices, it was customary to drive the individual clamping elements by a common drive. Pursuant to an improtant feature of the present invention, provision is made for a chuck device wherein the clamping elements can be controlled independently of each other so that the initiation of the full clamping effect of the clamping elements can be varied individually or the clamping effect itself decreased individually.

In the case of clamping elements having swinging or positively displaceable clamping jaws, it is possible to determine for each clamping element the moment of its engagement, and thus its maximum clamping effect, by means of an individual drive, and said drives can be controlled either individually or simultaneously. Under these circumstances, it is necessary to reduce the stretching force to zero, and to loosen the chuck device completely after the elongations have been measured and before the adjustment of the clamping elements is corrected.

In the case of loose clamping jaws, which can be displaced merely by entrainment and which normally abut sliding wedges, it would be possible, in order to reduce the stresses at the edges of the workpiece, to retract the sliding wedges with good lubrication under full or partial stretching load, so that the clamping jaws can slide down a certain amount during the stretching operation before they cause premature elongations of the edges.

The adaptation of the chucking device to the process of the present invention is particularly simple if clamping elements, working with a sliding wedge, about the frame body of the chuck device to permit a variable pre-adjustment of the adjusting elements. If the drives of the adjusting elements, for example, adjusting wedges, are not combined, but the elements are adjustable individually or in pairs, corrections in the sense of a loosening of the clamping elements can be effected under load, without affecting the sliding wedge drive, per se, correction under load or partial load has the advantage that the extent of the stress-strain reduction at the jeopardized edge areas of the workpiece being stretched can be observed during the correction.

Further developments of chuck devices, according to the present invention, are independent of the method of the present invention, since there is no need for a measurement in each stretching process. The differences in the elongations of the width of the workpiece can be determined from experimental values so as to provide a preliminary adjustment of the various clamping elements whereby the action of the outer elements can be delayed in the first stretching phase by a predetermined extension, caused by the immediate gripping of the clamping elements.

Referring now to the drawings in detail, a conventional extensometer 1 is utilized to ascertain the locally distributed extension or elongation of the planar member, plate or workpiece 4. The extensometer has two spaced calipers 2 and 3, caliper 2 being fixed and caliper 3 being pivotally movable. It will be noted that the calipers abut a surface of the workpiece and during extension thereof, caliper 3 is displaced relative to caliper 2. This motion is transmitted via lever 5, on one end of which caliper 3 is mounted, to a ratchet gear 6, at the other end of the lever. Gear 6 is meshed with pinion gear 7 provided with a pointer or index 8 which is moved along a scale 9 which indicates measured displacement values. The pinion gear 7 can also operate the shaft of a rotary potentiometer so that a measured voltage value responsive to the relative displacement of caliper 3, can be transmitted over the wires 10—11 for indication at a remote location.

Pursuant to the present invention, extensometers 1 are raised upwardly to the workpiece 4 by lifting devices generally indicated by the reference numeral 100. Device 100 comprises a lifting rod 12, from which an extensometer is suspended in stable position. The rod 12 is articulated on a bifurcated member 13 and can swing thereon, in the stretching plane of the workpiece, against the pressure of spring 14. An extensometer must have this freedom of movement to follow the extension of the workpiece without damage to the points of calipers 2 and 3. The bifurcated member 13 is carried by two governors 15—16 which are supported in bearing blocks 17—18. The dual governor system is so designed that the member 13 can be moved with the extensometer 1 toward or away from the workpiece, as shown in the full and broken line positions thereof in FIG. 2.

In order to effect the raising and lowering of the extensometer, provision is made for a driven rack 19 which drives a pinion gear 20 keyed to the bearing shaft 25 of the governor 16. The rack 19 is the rod of a piston 21 which is reciprocable in a cylinder 22 in response to a pressurized fluid introduced into the cylinder at either of the inlet valves 23 or 24.

If each raising device 100 has an individual drive each device can adapt itself to the irregularities in the workpiece surface. However, it is within the scope of the present invention to provide a common rack and pinion drive for all adjacent raising devices by means of a common shaft 25. Where this is done, the governors 15 and 16 are constituted by bendable springs. Despite surface irregularities in the workpiece, with a common lifting device all extensometers 1 can be brought into operative position in abutment with the workpiece. Due to the pendulum-like suspension of the extensometers by means of their associated rods 12, the extensometers can adapt to a possible inclination of the workpiece from its horizontal disposition, for example where the workpiece sags under the tensile stress thereof. As a result, the extensometers are always parallel to the undersurface of the workpiece.

By having the extensometers raised to the workpiece from a position therebelow, the space above the workpiece is free and the sensitive measuring instruments, normally positioned thereabove, cannot be damaged when a workpiece is inserted into the apparatus. In the embodiment illustrated in FIGS. 1 and 2, the lifting mechanism 100 is mounted on one of two opposed stretch members or frame body 26 (one of which is shown). These stretch members 26 carry a chuck 26a so that the measurements can be made in the direct area of the point of support, even if the chuck traverse is adjustable. The stretch members 26 are moved apart to stretch sheet 4.

FIG. 3 illustrates a portion of a sheet-stretching machine 101 and shows the arrangement of the complete measuring mechanism on the machine. The device 26a is a movable chuck in which the plate 4 is clamped by means of a plurality of clamping elements indicated by the reference numerals 27 through 36.

The stretching force is produced in cylinders 37 and is transmitted by the pressure posts 38 to the movable chuck 26a which extends transversely thereof.

As shown in FIG. 3, seven extensometers 1, each provided with the calipers 2—3, are lifted by mechanisms 100 (FIG. 2), from a position below the plate 4 to abut the lower surface thereof, being arranged in a plane transversely of the plate. The measurements, determined by the movement of each caliper 3 relative to its associated caliper 2, are transmitted as voltages, as previously described, over wires 10—11 to a panel 39 provided with meters or indicators 40 which visually show the extent of each measurement.

Since the clamping elements 27—36 directly abut the frame body 26 of the chuck, the frame body will bend slightly in the center thereof during the stretching operation. Consequently, the central clamping elements, for example 30 to 33, will be displaced so as to partially loosen their clamping action whereby the plate 4 will be stretched to a greater extent along its opposite longitudinal edges 102 and 103 than in its central region 105.

Said variation in the extent of elongation of plate 4 is measured by the extensometers 1 and may be read on the meter 40. The curve 41 illustrates the course of the elongation over the widthwise dimension of the plate. The variation in the elongation of the plate, considering its widthwise dimension, create internal stresses in the workpiece which can be sufficient to rupture the workpiece. In order to avoid this, the determination of the course of the elongation measurements over the widthwise dimension of the workpiece, pursuant to the present invention, is utilized to correct the conditions at chuck 26a in order to obtain a uniform course of extension measurements or values. For this purpose, the stretching process is halted and correction is made in various ways, depending on the construction of the chuck.

In the case of chuck provided with conventional clamping elements constituted by a pair of wedged jaws 42, as shown in FIG. 2, which jaws can be moved only simultaneously and positively over pull rods 43 by a common drive, the length of the lever system of each individual wedged jaw and pair of wedged jaws, respectively, is made variable, pursuant to the present invention, by inserting a turnbuckle 44 in each rod 43. A scale can be provided for each turnbuckle 44 to determine the longitudinal variations in the rod.

A uniform elongation of the plate 4 can be achieved with a chuck 26 in the following manner:

After the course of the elongation has been determined or plotted by means of the mechanisms illustrated in FIGS. 1–3, or the course is predetermined on the basis of experimental values, the machine 101 is unloaded and the wedged jaws 42 are loosened. The turnbuckles 44 for those clamping elements, which are to operate at maximum after such operation of the remaining clamping elements, are actuated. The simplest way to effect this correction is to retract the wedged jaws of the outermost clamping elements 27—29 at edge 103 and 34—36 at edge 102, since their lever systems 43 are shortened by their turnbuckles 44.

When all the clamping elements have been displaced uniformly by their common drive, the central clamping elements move into operative position, as shown in full line in FIG. 2, while the outer clamping elements do not grip the plate 4, as shown in broken line in said figure. If the plate is now stretched, or the stretching is resumed, the jaws 42 of the central clamping elements 30—33 are carried along the stretching direction due to the wedge effect and thus obtain their maximum clamping effect.

The frame body 26 bends up, and the jaws slide down along their abutment surfaces 45. Due to the intercoupling of all clamping elements, the trailing jaws of the outer clamping elements follow this motion so that they now also grip. The upward bending of the frame body 26 may increase slightly or not at all, since it has already been considerably bent upwardly prior to the concentration of the entire clamping force.

The central clamping elements which were first to grip, and the bending are relieved by the action of the outer clamping elements with regard to the bending stress. Because of the restraint of the jaws of the central clamping elements, the frame cannot spring back, so that a form of residual stress remains which is eliminated when the full stretching force is applied.

The embodiment of the chuck illustrated in FIG. 2 differs from prior art devices by the use of the turnbuckles 44 which make it possible, with a coupled and positive drive of all the wedged jaws, to vary the initiation of the full clamping effect of the clamping elements. In lieu of the wedged jaws 42, there can be provided conventional swinging jaws whose full clamping force is also produced only under full stretching load.

Since a separate electric drive for each turnbuckle 44, for rapid operation thereof, may offer difficulties in construction, it is preferable to provide the chuck 26, illustrated in FIG. 2, with a common drive for all the clamping elements, in order to obtain desired pre-adjustments pursuant to the present invention. As previously indicated, this correction cannot be effected under load because of the engagement of the workpiece 4 by the toothed or serrated surface 42a of the wedged jaw 42.

Figure 4:
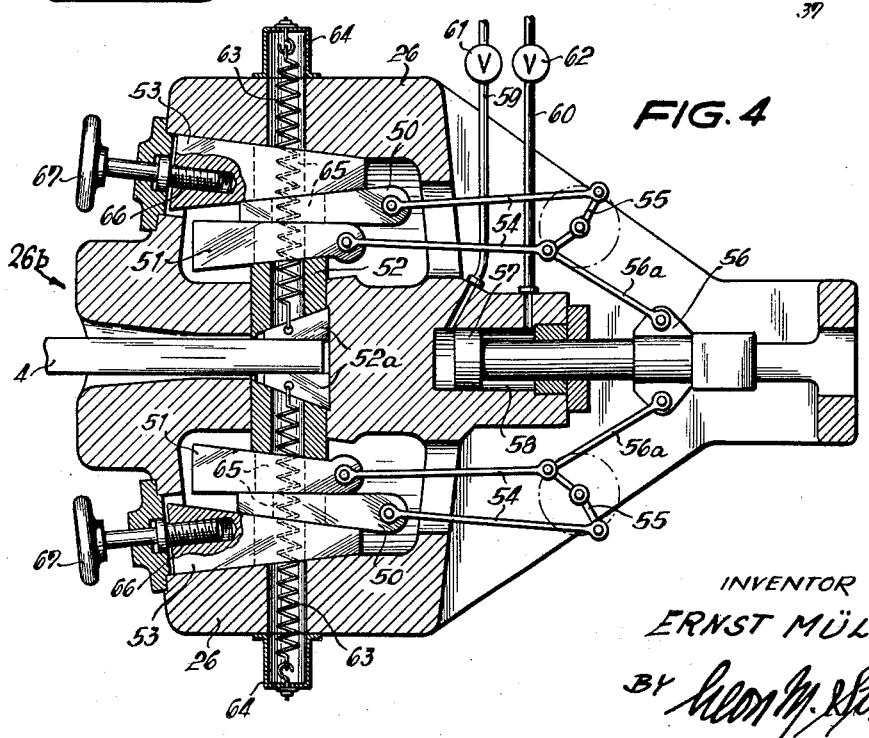
FIG. 4 illustrates, in section, a chuck pursuant to the present invention.

Referring now to FIG. 4 in detail, there is shown another embodiment of a chuck, pursuant to the present invention. The chuck 26b comprises a uniform cast steel body 26 which houses all clamping elements, namely, those engaging the workpiece 4, both from the top and the bottom thereof.

In the present embodiment, a clamping element comprises two pairs of oppositely moving sliding wedges 50 and 51, one perpendicular pressure piece 52, a separately moving wedge end 52a for each pair, and an adjusting wedge 53, for each pair, serving as an abutment. The two sliding wedges 50—51 are connected by push rods 54 with a crank 55. The crank is driven by a toggle lever 56 by means of a push rod 56a. The toggle lever is guided for rectilinear movement and operated hydraulically by means of a cylinder 58 and piston 57. Conduit 59 is a water pressure supply line for the cylinder and conduit 60 is a discharge line therefor, valves 61 and 62 being provided in said lines respectively.

All the moving parts 50, 51 and 52 in the chuck are subjected to the tensile force of a spring 63. One end of the spring is secured to the wedge piece 52a and the other end to a hood 64 mounted on the body 26. Each spring 63 passes through the body 26 and the associated adjusting wedge 53, sliding wedges 50—51 and pressure piece 52. In view of the relative motion of the sliding wedges and the adjusting wedge relative to the spring 63, oblong apertures 65 have to be provided in these parts.

The chuck 26b operates as follows:

In the starting position, shown in FIG. 4, all moving parts are retracted by the force of the springs 63. The sliding wedges are also in starting position, corresponding to the largest jaw opening. When a pressurized fluid is applied to piston 57, through conduit 59, toggle lever 56 moves to the right, viewing FIG. 4, so that the wedges 50 move in the opposite direction through the median of the links 56a, the cranks 55 and the rods 54.

The pressure members 52a are, as a result, moved perpendicular to the clamped end of the plate 4, and abut the latter. When the plate 4 is subjected to tensile stress, the wedged pressure members 52a automatically readjust and exert an additional clamping force in proportion to the tensile stress.

When, due to the large reaction forces which it must absorb, the cast steel body 26 bends up in its central area in the course of the stretching process, all moving parts 50, 51, 52 and 53 yield so that the wedges 52a can slide down in the direction of the stretching action.

The amount of the extension of plate 4 is reduced by the amount which the wedges 52a can yield in the stretch direction, with regard to the portions of the plate associated with clamping elements whose clamping effect is not affected as much by the upward flexing of the body 26. The simplest way to correct the chuck in order to obtain a uniform distribution of the extension of the workpiece is by means of the adjusting wedges 53 which permit the chuck to be readily adjusted for various plate thicknesses. Each adjusting wedge has its own adjusting mechanism comprising a spindle 66 and a handwheel 67. Consequently, the adjusting wedges of the outer clamping elements 27—29 and 34—36 (FIG. 3) can be separately retracted to permit the associated wedge members 52a thereof to slide down. In this manner, excessive elongation of the plate at its edges is eliminated and the edge elongations are adapted to the extent of elongation in the central area of the plate.

This process can be effected under load with an appropriate construction of the adjusting drive for the adjusting wedges. In this correcting procedure, one of the valves 61—62 must be closed so that the retracting motion of the adjusting wedges of a clamping element is not cancelled again by a readjustment of the sliding wedges 50—51.

The previously described method for obtaining correction does not require a separate, individually controllable motive drive for each clamping element. The pressure-fluid conduits 59—60 can be common to all the clamping elements so that only one valve 61 and one valve 62 need be provided since, in the retraction of the adjusting wedges in the individual clamping elements, the motive drive for all the other clamping elements can be blocked by closing either valve 61 or valve 62.

In chucks which are similar to chuck 26b but are not provided with the adjusting wedges 53, it is necessary, when correcting a chuck, for each clamping element to be individually controllable. Each cylinder must have a supply conduit 59 and a discharge conduit 60, each with its valves 61 and 62. If it is assumed that the adjusting wedges are part of the cast steel body 26, a chuck correction can be made as follows:

Theoretically, it would be possible to displace the sliding wedges 50, 51, at the outer clamping elements under load, by their individual motive drives in such a manner that the clamping effect is loosened and the wedge pieces 53a slide down. But, using a hydraulic drive, the exact degree of this adjusting motion cannot be determined.

The passage of the coefficient of friction between the sliding wedges and their abutment surfaces, from rest to motion, is an uncertain factor which is unimportant in the spindle drive of the adjusting wedges. It is preferable, therefore, to forego this type of correction.

The situation is different if the stretching process is halted, the stretching force reduced and the chucks loosened. Consequently, before the second stretching phase, there can be produced a varying pre-adjustment of the sliding wedges, and consequently, a varying pre-adjustment of different times of operation of the wedges 52a by the individual motion drive for each clamping element, so that the central clamping elements 30—33 (FIG. 3) grip first during a continuous stretching operation, and the wedged jaws of the outer clamping elements 27—29 and 34—36 grip at a later time, after the sliding wedges have advanced together after the pre-adjustment.

It is within the scope of the present invention to make all the operations automatic, to a great extent, such as the measurement and correction of the chucks. For example, each of the spindles 66 of the adjustment wedges 33 can be driven by a motor and the motors can be directly controlled by increased readings at the meters 40 (FIG. 3) or measuring devices 8—9 (FIG. 1).

It is possible also to estimate the course of the measurements during the stretching operation, without taking actual measurements, and to obtain the desired result with a chuck where the lever systems 43 of the clamping elements 42 (FIG. 2) have an increasing length from the inner to the outer clamping elements, from the beginning of the operation and without any variations provided.

A prerequisite for this method is a synchronous coupling and a common drive for all the clamping elements. Although this is a somewhat inaccurate way of equalizing different elongations in sheets to be stretched (because of the estimate of the course of extension), it is nevertheless a promising method, particularly for stretching machines which are seldom or never changed for other workpiece dimensions.

Consequently, it will be apparent that the basic concept of the present invention resides in a chuck with delayed action of the clamping elements toward the unyieldingly supported clamping elements.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In the method of elongating an element in a stretching machine which has two chucks gripping said element at opposite ends by means of a plurality of separate laterally spaced clamping means whose reaction forces during elongation of said element are absorbed directly by the bodies of said chucks, which are subjected to flexing in response thereto; the steps of measuring the elongations of said element in a first stretching phase thereof at predetermined points extending across the width of said element, comparing the element measurements resulting therefrom, and then adjusting said clamping means before resuming a further phase of stretching operation, and resuming further stretching to effect clamping at the locations of lesser elongation before clamping at the location of greater elongation.

2. In the method, as set forth in claim 1; characterized in that adjustments of said clamping means are made by retarding the full effectiveness of those of said clamping means adjacent the locations of greatest elongation during said further stretching phase, so that adjusted ones of said clamping means only become fully effective after the remaining clamping means producing lesser elongations of said element have reached their full effectiveness.

3. In the method, as set forth in claim 1, including the step of utilizing said chucks for effectuating the measurements of various elongations of said element.

4. A stretching machine for elongating sheet material comprising spaced opposed relatively displaceable stretch members between which the material is held, each of said stretch members having a plurality of laterally spaced chuck elements connected thereto for movement therewith, means for moving said stretch members apart relatively to stretch the material held therebetween by said chuck elements, said chuck elements each including a clamping jaw movable into engagement with the sheet material upon movement of said stretch members apart relatively, and adjustable means connected to each of said clamping jaws to vary independently the movement of said jaws into clamping engagement with the sheet material in accordance with movement of said stretch members.

5. A stretching machine for elongating sheet material according to claim 4, wherein said adjustment means includes a member connected to said stretching member and movable therewith to move said clamping jaw into clamping engagement with the sheet material, and means for adjusting the position of said clamping jaw in relation to said member.

6. A stretching machine for elongating sheet material according to claim 5, wherein said means for adjusting the position of said clamping jaw includes turn buckle connection means for moving said clamping jaw toward or away from said movable means.

7. A stretching machine according to claim 5, wherein said member connected to said stretch member is a portion of said stretch member having an inclined face, said jaw having an inclined face slidable on the inclined face of said member whereby said jaw is moved upwardly and downwardly upon lateral movement of said stretch member.

8. A stretching machine for elongating sheet material according to claim 4, including a reciprocatable jaw member movable downwardly into clamping engagement with the sheet material, means connected to said stretch member to move said movable jaw downwardly along with movement of said stretch member, and an adjustment means for said movable jaw to vary the initial position thereof and the time after actuation of said stretch member at which said clamping jaw moves into clamping engagement with the sheet material.

9. A stretching machine for elongating sheet material comprising opposed stretching element frames each having a plurality of laterally spaced chuck elements mounted thereon and movable therewith, means for moving at least one of said stretch frames toward and away from the other of said stretch frame members, said clamping chuck elements each including a clamping jaw movable into engagement with the sheet material upon movement of said stretching element frames apart, and means connected to said stretch members and to said chuck elements to vary independently the initiation of movement of each of said clamping jaws into clamping engagement upon movement of said stretching element frames.

References Cited in the file of this patent

UNITED STATES PATENTS

| | | |
|---|---|---|
| 187,957 | Baldwin | Mar. 6, 1877 |
| 312,607 | Britton | Feb. 24, 1885 |
| 312,608 | Britton | Feb. 24, 1885 |
| 1,190,596 | Scott | July 11, 1916 |
| 2,003,127 | Vaughan | May 28, 1935 |
| 2,245,316 | Amsler | June 10, 1941 |
| 2,318,242 | Matteson et al. | May 4, 1943 |
| 2,392,899 | Banner | Jan. 15, 1946 |
| 2,437,131 | Shaw | Mar. 2, 1948 |
| 2,447,208 | Rendel | Aug. 17, 1948 |
| 2,520,786 | Scott | Aug. 29, 1950 |
| 2,522,319 | Tinley | Sept. 12, 1950 |
| 2,663,085 | Ruge | Dec. 22, 1953 |
| 2,855,972 | Greider | Oct. 14, 1958 |
| 2,917,920 | Robinette | Dec. 22, 1959 |